Nov. 1, 1966   J. S. TROYER ETAL   3,282,353
SOIL CUTTING IMPLEMENT FOR ROTARY TILLERS
Filed July 9, 1965   2 Sheets-Sheet 1
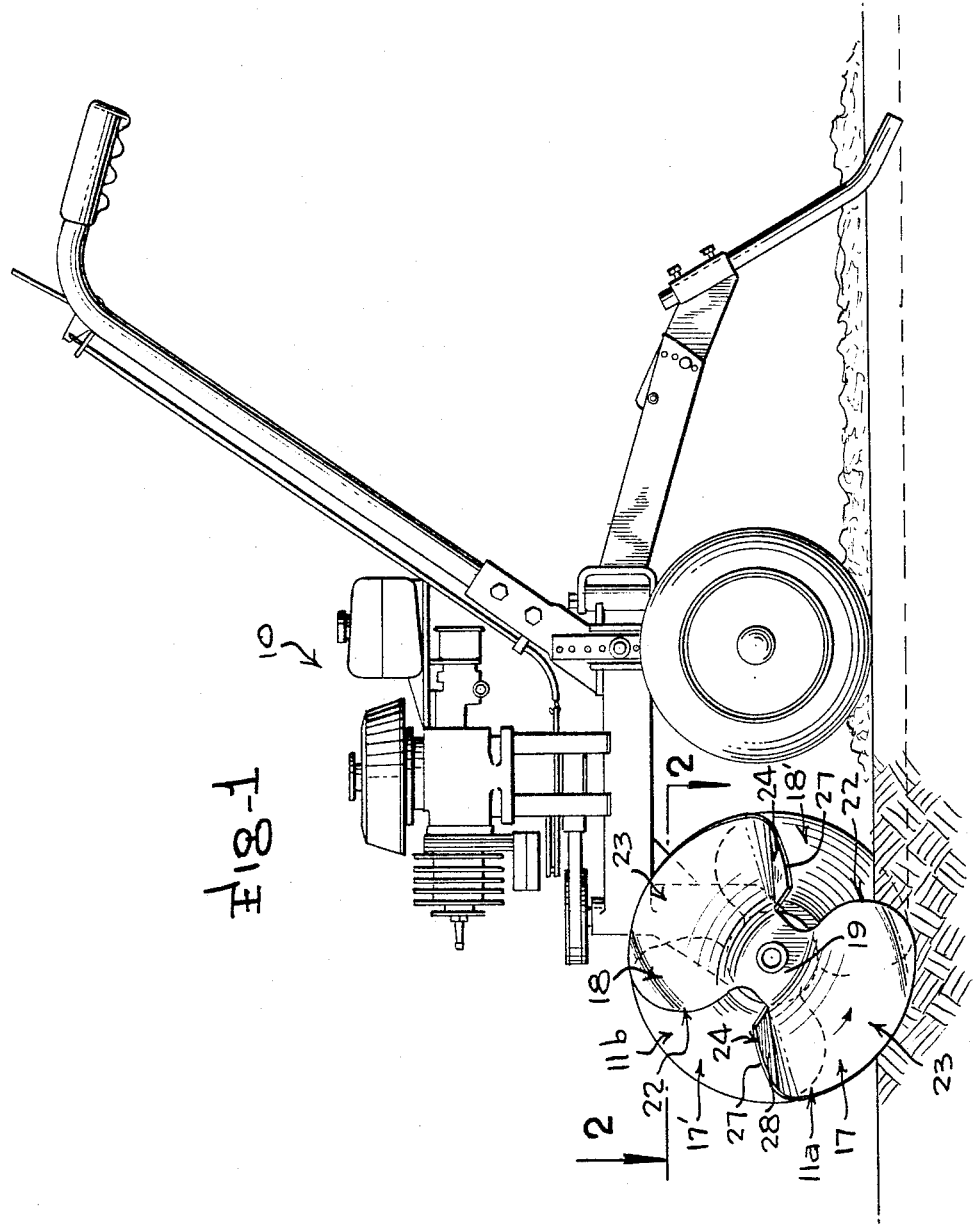
INVENTORS
JOHN S. TROYER &
MARGARITA G. TROYER
BY Mason, Fenwick & Lawrence
ATTORNEYS

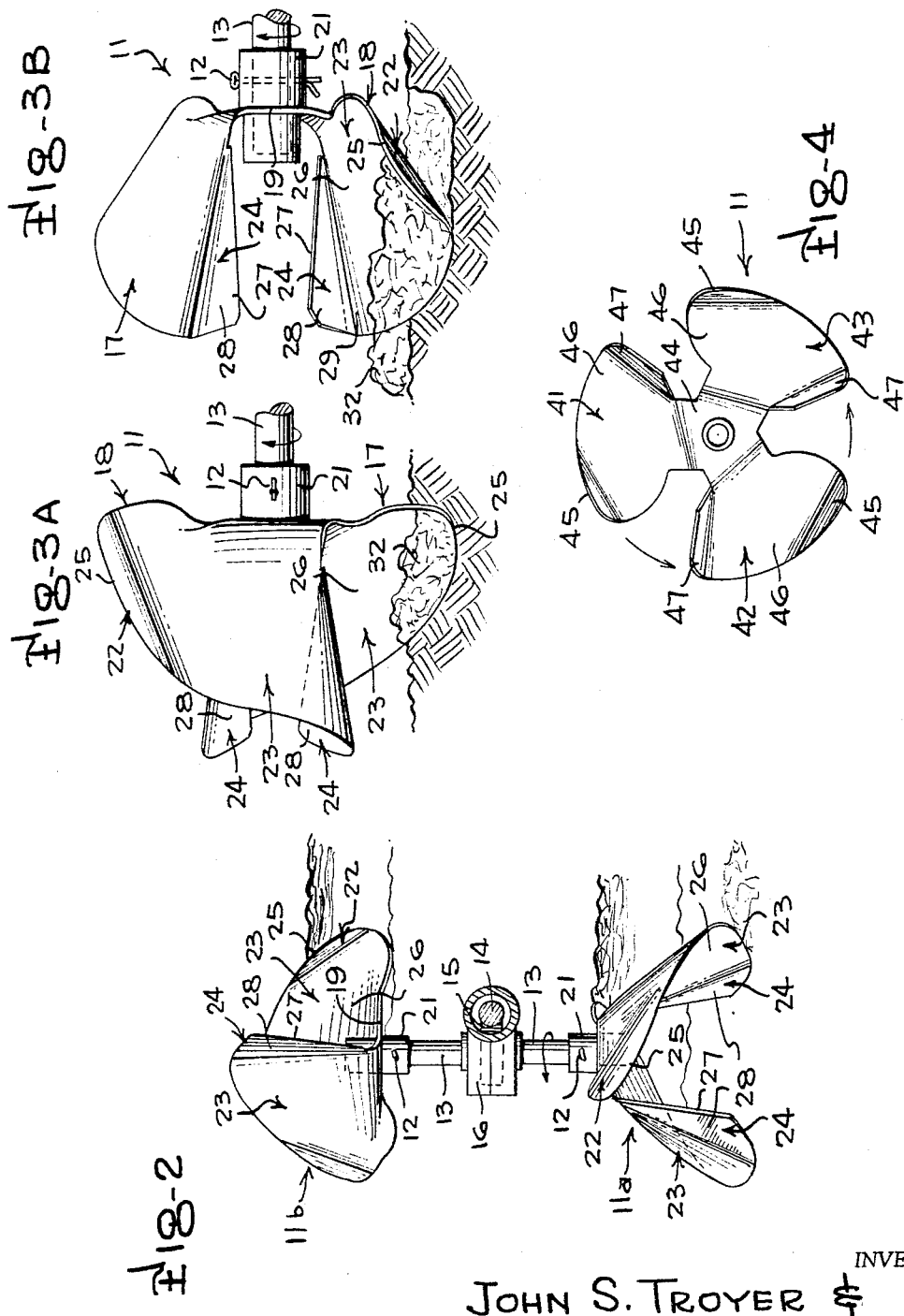

3,282,353
SOIL CUTTING IMPLEMENT FOR ROTARY
TILLERS
John S. Troyer and Margarita G. Troyer, both of
Trevilians, Va.
Filed July 9, 1965, Ser. No. 470,783
2 Claims. (Cl. 172—43)

This invention relates in general to a machine for cultivating the soil and more particularly to a blade attachment for rotary cultivators to perform mulching and hilling of the soil along predetermined planting rows.

Generally, in small garden rotary cultivators of the type herein described, the soil engaging implements are of elongated shapes and used mainly to penetrate into the ground a sufficient distance for the purpose of disturbing the soil and pulverizing it. These elongated implements only pulverize the soil where it lies and generally do not deposit it to one side or the other of the cultivator. In certain applications it is desirable that soil be scooped out of a furrow and deposited to one side of the cultivator for the purpose of mulching already planted crops or depositing the soil in a neat row of elongated hills, so that certain crops may be planted in a raised condition. Before the instant invention, no implement had been devised for small rotary cultivators which would pulverize the soil and then scoop it up and deposit it at a desired location.

Therefore, an object of this invention is the provision of a soil cutting implement for rotary cultivators which will effect hilling or mulching along predetermined planting rows.

Another object of this invention is the provision of a soil cutting implement for rotary cultivators having a plurality of blades which engage the soil, scoop a portion of the soil up, and deposit it to the side of the cultivator as the cultivator is being driven in a forward direction by the action of the tilling blades coming in contact with the soil.

Another object of this invention is the provision of a soil cutting implement having a plurality of tilling blades of desired configuration to effect the removal of soil from between planting rows and depositing the removed soil upon the planting rows.

Anther object of this invention is the provision of a soil cutting implement for rotary cultivators which can be used for constructing planting rows for a high-bed planting and at the same time, leaving a furrow between the rows for irrigation purposes.

Other objects, advantages and capabilities of the invention will become apparent from the following description, taken in conjunction with the accompanying drawings showing only a preferred embodiment of the invention.

In the drawings:
FIGURE 1 is a side elevation view of a rotary garden-type cultivator utilizing the soil cutting implement of the present invention;
FIGURE 2 is a horizontal section view of the soil cutting implement taken along lines 2—2 of FIGURE 1;
FIGURE 3A is a partial front elevation view of one of the soil cutting implements of this invention;
FIGURE 3B is a partial front elevation view similar to that shown by FIGURE 3A; however, showing the soil cutting implement rotated 180 degrees about its axis; and
FIGURE 4 shows a side elevation view of a modified form of the soil cutting implement of the present invention.

Referring to the drawings wherein like reference characters designate corresponding parts throughout the several figures, a garden tractor which utilizes the soil cutting implement of the present invention is generally indicated by the numeral 10. The soil cutting implement 11 is attached by means of a removable pin 12 to the tiller blade power shaft 13. The shaft 13 is driven by means of a main power shaft 14 which is interconnected with the drive mechanism of the tractor 10. Interconnecting the main power shaft 14 with the tiller blade power shaft 13 is a suitable gear train 15 located in a gearing housing 16.

Comprising the soil cutting implement 10 are a plurality of tilling blades 17, 18. The tilling blades 17, 18 are interconnected by a yoke 19 which is permanently affixed to a hub 21. Since the hub 21 is connected to the tilling blade power shaft 13, it is easily seen that the center of rotation of the soil cutting implement 11, and ultimately the tilling blades 17, 18, is about the longitudinal centerline of the power shaft 13.

Since the tilling blades 17, 18 are identical it shall suffice to describe one specifically and such description shall equally apply to the other. The blades generally comprise three main sections, namely a leading portion 22, an intermediate portion 23, and a trailing portion 24. The blades 17, 18 generally intersect the connecting yoke 19 in a manner so that the major elongation of the blades project from the yoke divergently with respect to the longitudinal centerline of the shaft 13. This construction places the yoke 19 toward the cultivator 10 while the blades have their operating portions facing outwardly.

The leading portion 22 of each blade is generally concave with respect to the centerline axis of the shaft 13 and terminates in its forwardmost portion in a leading edge 25. As can be seen in the drawings and especially FIGURE 3B, the leading portion 22 has a relatively sharp radius of curvature. The intermediate portion 23 of the blade also has a concave surface with respect to the centerline of shaft 13 and this surface is indicated by numeral 26. The concavity of the surface 26 has a radius of curvature that is less than the radius of curvature of leading portion 22. This results in a construction that provides a scooping and soil carrying portion for the blades. The trailing portion 24 of the blades is that portion which projects from the intermediate portion remote from the leading portion. The trailing portion 24 of the blades has a terminal trailing edge 27 and a planar surface portion 28. The planar surface 28 intersects with the intermediate portion 23 of the blade at a point of greatly increased curvature 29 that approximates a relatively sharp bend. By such a configuration the trailing portion 24 bends sharply towards the centerline of shaft 13 and prevents the scooped up soil from being deposited behind the blades in the furrow just formed. Therefore, as the blades revolve, the dirt is forced by the amount of inclination, or divergence, of the blades with respect to the centerline of the shaft 13 and by the planar surface 28 to be deposited to the side of the just dug furrow 31.

In operation of the present invention when it is desired to mulch growing plants or to make a raised row for planting desired plants therein, it is merely necessary to attach the soil cutting implement to the blade power shaft 13. If the cultivator is equipped with a more conventional type cultivating blade, then it would be necessary to remove this blade and then attach the implement 11 to the shaft by means of a pin 12. Obviously, in the most common type of cultivators 10, there will be need for a right hand and a left hand model of the implement so that a balanced system would be effected on each side of the cultivator. The configuration having a left hand implement 11a and a right hand implement 11b is shown by FIGURES 1 and 2. Implement 11a carries the blades 17, 18 and implement 11b carries blades 17', 18'. As the power transmission means of the cultivators are engaged, the implement 11 is caused to rotate at a relatively low speed and engage the soil 32 with the leading edge 25 of the blades, 17, 18. However, only one of the blades would engage the soil at any one time. Once the leading edge 25 engages the soil, it cuts through to the desired depth and upon continued rotation the soil is scooped to the intermediate portion and deposited by the blade outside of the just dug furrows 31. The soil 32 is deposited from the blades by means of the angle of divergence with respect to the centerline of the shaft 13 and by the planar surface 28 which forces the soil to be disengaged from the intermediate portion 23 before it has a chance to fall back into the furrow 31.

The embodiment of the invention shown by FIGURE 4 is an implement having three tilling blades 41, 42, 43. These blades are exactly the same configuration as the ones which are shown in the preferred embodiment; however, it may be desired at times to have an implement which has smaller blades and more of them. The blades 41, 42, 43 each are connected to a yoke portion 44 and comprise a leading portion 45, an intermediate portion 46, and a trailing portion 47. The relative configuration of various portions of the blades 41, 42, 43 are the same as those just discussed with respect to blades 17, 18. Obviously it may be desired at times to have an implement which consists of four or more tilling blades and such an implement would generally correspond to the two embodiments shown herein.

While I have particularly shown and described one particular embodiment of the invention, it is distinctly understood that the invention is not limited thereto but that modificaions may be made within the scope of the invention and such variations as are covered by the scope of the appended claims.

What is claimed is:

1. A rotary tilling implement for cultivating the soil adapted to be mounted upon an elongated, longitudinal, outwardly extending power shaft driven by a motive means over the ground surface, the power shaft being arranged at right angles to the direction of implement travel, the improvement comprising a hub affixed in detachable relation with the power shaft means, a yoke member mounted at right angles upon the hub, a plurality of tilling blades mounted upon the yoke member and extending outwardly from the power shaft at a divergent angle with respect to the longitudinal centerline of the power shaft, each tilling blade having a leading portion and an intermediate portion and a trailing portion, the trailing portion being of planar surface configuration, the planar surface intersecting the intermediate portion at a sharp angle so that the plane in which the planar surface lies projects toward the longitudinal centerline of the shaft, each tilling blade being concave in overall configuration with respect to the longitudinal centerline of the power shaft to effect scooping of the soil into the concavity of the tilling blade thereby creating a furrow, each blade being adapted to effect removal of the scooped soil from the blade and to deposit the soil outwardly from the furrow in a predetermined path.

2. A rotary tilling implement for cultivating the soil adapted to be mounted upon an elongated, longitudinal, outwardly extending power shaft driven by a motive means over the ground surface, the power shaft being arranged at right angles to the direction of implement travel, the improvement comprising a hub affixed in detachable relation with the power shaft means, a yoke member mounted at right angles upon the hub, a plurality of tilling blades mounted upon the yoke member and extending outwardly from the power shaft at a divergent angle with respect to the longitudinal centerline of the power shaft, each tilling blade having a leading portion and an intermediate portion and a trailing portion, the leading portion the leading portion being concave with respect to the longitudinal centerline of the power shaft and terminating at the forwardmost part in a leading edge, the concavity of the leading portion having a relatively sharp radius of curvature, the intermediate portion being concave with respect to the longitudinal centerline of the power shaft and generally diverging therefrom, the concavity of the intermediate portion having a radius of curvature greater than that of the leading portion, the trailing portion being of planar surface configuration, the planar surface intersecting the intermediate portion at a sharp angle so that the plane in which the planar surface lies projects toward the longitudinal centerline of the shaft, each tilling blade being concave in overall configuration with respect to the longitudinal centerline of the power shaft to effect scooping of the soil into the concavity of the tilling blade thereby creating a furrow, each blade being adapted to effect removal of the scooped soil from the blade and to deposit the soil outwardly from the furrow in a predetermined path.

References Cited by the Examiner

UNITED STATES PATENTS

| | | | |
|---|---|---|---|
| 198,540 | 12/1877 | Graner | 172—119 |
| 704,857 | 7/1902 | Castelin | 172—556 |
| 1,043,175 | 11/1912 | Van Vranken | 172—532 |
| 1,119,862 | 12/1914 | Nilson | 172—556 |
| 1,232,025 | 7/1917 | Goldschmidt | 172—556 |
| 2,847,924 | 8/1958 | Quick | 172—42 X |
| 2,903,077 | 9/1959 | Kamlukin | 172—42 |
| 3,120,279 | 2/1964 | Horowitz | 172—42 |

FOREIGN PATENTS 482,569   1/1917   France.

ABRAHAM G. STONE, *Primary Examiner.*

F. B. HENRY, R. L. HOLLISTER, *Examiners.*